United States Patent
Kashti et al.

(10) Patent No.: US 8,934,142 B2
(45) Date of Patent: Jan. 13, 2015

(54) HALFTONE SCREEN

(71) Applicant: Hewlett-Packard Indigo B.V., Amstelveen (NL)

(72) Inventors: Tamar Kashti, Rehovot (IL); Tal Frank, Rehovot (IL); Oren Haik, Beer-Sheva (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 87 days.

(21) Appl. No.: 13/873,483

(22) Filed: Apr. 30, 2013

(65) Prior Publication Data

US 2014/0320928 A1 Oct. 30, 2014

(51) Int. Cl.
*H04N 1/405* (2006.01)
*H04N 1/60* (2006.01)

(52) U.S. Cl.
CPC ................. *H04N 1/4051* (2013.01)
USPC ............... 358/3.06; 358/3.13; 358/1.9

(58) Field of Classification Search
CPC ................................. H04N 1/4052
USPC ....................... 358/3.06, 3.13, 1.9
See application file for complete search history.

(56) References Cited

U.S. PATENT DOCUMENTS

| | | | | |
|---|---|---|---|---|
| 5,696,602 A | * | 12/1997 | Cooper et al. | 358/3.19 |
| 5,742,405 A | | 4/1998 | Spaulding et al. | |
| 5,787,238 A | * | 7/1998 | Wang | 358/1.9 |
| 5,946,452 A | * | 8/1999 | Spaulding et al. | 358/1.9 |
| 6,710,778 B2 | | 3/2004 | Cooper | |
| 7,031,025 B1 | | 4/2006 | He et al. | |
| 7,099,049 B2 | * | 8/2006 | Yu et al. | 358/3.26 |
| 8,576,448 B2 | * | 11/2013 | Shacham et al. | 358/3.06 |
| 2004/0233477 A1 | * | 11/2004 | Stanich et al. | 358/3.14 |
| 2011/0279831 A1 | * | 11/2011 | Shacham et al. | 358/1.9 |
| 2012/0182344 A1 | * | 7/2012 | Shacham et al. | 347/15 |

FOREIGN PATENT DOCUMENTS

WO WO-2006136600 A1 12/2006

OTHER PUBLICATIONS

He, Zhen, et al., "AM/FM Halftoning: A Method for Digital Halftoning Through Simultaneous Modulation of Dot Size and Dot Placement", Jul. 17, 2002.

* cited by examiner

*Primary Examiner* — Houshang Safaipour
*Assistant Examiner* — Walter Yehl
(74) *Attorney, Agent, or Firm* — Haseltine Lake LLP; Alex Rogers

(57) ABSTRACT

A halftone screen may be used to transform a continuous tone image into a halftone image. Determining the halftone screen may include determining a first halftone tile for a first gray level, selecting pixel locations and increasing the intensity of pixels at the locations to activate the pixels to form a second halftone tile for a subsequent gray level. A filtered image may be generated from the second halftone tile, and pixels from the filtered image may be used to generate the halftone screen.

15 Claims, 9 Drawing Sheets

HALFTONE SCREEN

BACKGROUND TO THE INVENTION

Imaging systems are used to transform a given continuous tone input image to a halftone image. For example, an image capturing device or computer screen may provide a given continuous tone image which is subsequently transformed to a halftone image suitable for printing the input image. However, difficulties may arise when transforming a continuous tone input image to a halftone image. In particular the resulting halftone image may add undesirable visible patterns and/or undesirable noise compared to the continuous tone image.

BRIEF DESCRIPTION OF DRAWINGS

For a more complete understanding, reference is now made to the following description taken in conjunction with the accompanying drawings in which.

DETAILED DESCRIPTION

A common method of halftoning is Amplitude Modulation (AM) or periodic clustered-dot, which produces clusters of pixels (spots) that vary in size on a grid. An alternative method is Frequency Modulation (FM) or stochastic halftoning in which equal-size spots are placed at varying spacing and is used predominantly in ink-jet printers and some high quality offset applications.

The smoothness of the screen in different gray levels is highly affected by the dot placement. For a given tile of around 100×100 pixels, there can be around $10^{40}$ options of dot configurations per gray level. Some techniques minimize a cost function over a small subset (e.g. $10^6$) of random dot configurations by adding each time one pixel, till it gets to the next gray level. The algorithm does not check convergence to a minimum but rather looks for "the best of the subset". It results in good screens (the pre-computed mask of dots), which are relatively smooth, and have smooth transitions, have few artifacts and are stable to changing press conditions. To improve the print quality, an iterative convergence method which search in screen space for the smoothest screen is utilised rather than sampling this space.

The process of halftoning includes both deterministic and iterative processes for optimization of the halftoning appearance. While stochastic halftoning tends to use state-of-the-art convergence methods for the iterative processes, these are not used in amplitude-modulation halftoning. The main challenge in iterative convergence is to avoid local minima and obtain a global minimum, or at least a "best minimum", as it is hard to prove that a solution is the global minimum. A technique of avoiding local minima for cluster-dot halftoning called Cluster-Dot Void and Cluster, which is based on a family of stochastic-halftoning optimization algorithms.

There are other approaches for getting a "best minimum", and avoiding local minima. One popular method is Simulated Annealing, an iterative algorithm that retains all random swaps that decrease the cost function as well as a percentage of swaps that may increase the cost function ("annealing"). In each phase (which includes many iterations), the percentage of higher cost swaps that are kept is reduced. This algorithm is used in the design of stochastic screens.

Figure 1:
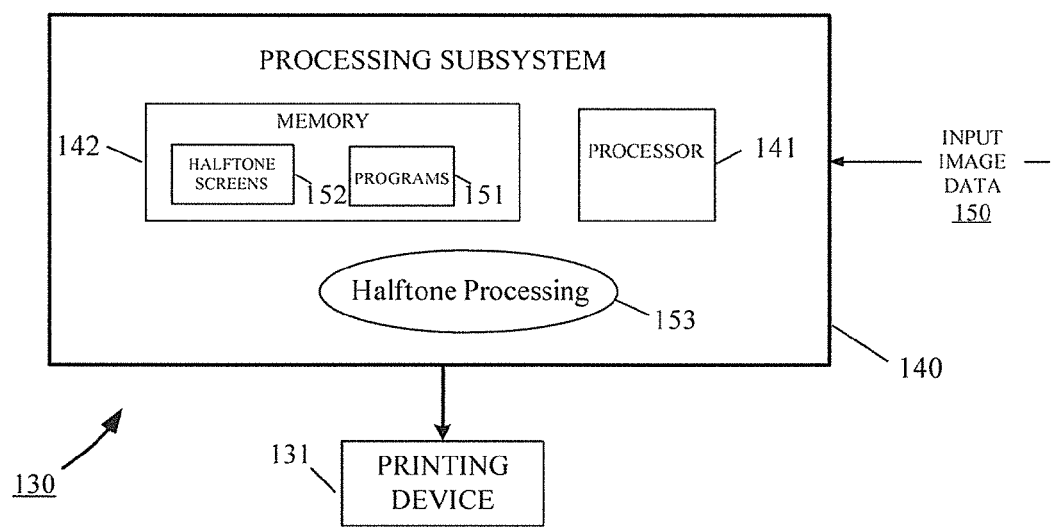
FIG. 1 is a simplified schematic of an example printing system.

FIG. 1 depicts an example printing system 130 employing screens embodying the invention, the system being arranged to receive input image data 150 and print one or more corresponding prints, for example color prints, upon a substrate such as paper, labels, transparencies, etc. For example, the printing system 130 may be a digital press, such as an HP Indigo digital printing press available from Hewlett-Packard Company.

The printing system 130 includes a printing device 131 which includes the various components such as media feed unit, a print engine, and an output handling unit for transferring the media feed unit to the print engine for the formation of printed images and subsequently outputted to the output handling unit. The printing system 130 further includes a processing subsystem 140 arranged to receive and process the input image data 150 thereby to generate control signals for feeding to the printing device 131 to cause it to print a corresponding print.

The processing subsystem 140 is typically in the form of a program controlled processor 141, and associated computer-readable storage medium (memory) 142 comprising both volatile and non-volatile sections. The memory 142 stores a set of programs 151 for causing the processor 141 to control the operation of the printing system 130 and to carry out processing including, in particular, halftone processing 153 of the input image data 150 using, in the present example, halftone screens 152 stored in the memory 142. The halftone screens 152 serve to provide a set of screens embodying the present invention. The set of programs 151 may also effect initial color management processing of the input image data 150, with respect to a color printing system, to derive appropriate ink coverage values. The memory 142 also serves as a temporary store for intermediate processing results. It will be appreciated that the processing subsystem 140 may take other forms such as dedicated hardware (for example an ASIC or suitable programmed field programmable array).

In operation, the printing system 130 operates in standard manner to affect halftone printing of images using the halftone screens 152 as described in more detail below.

Figure 2:
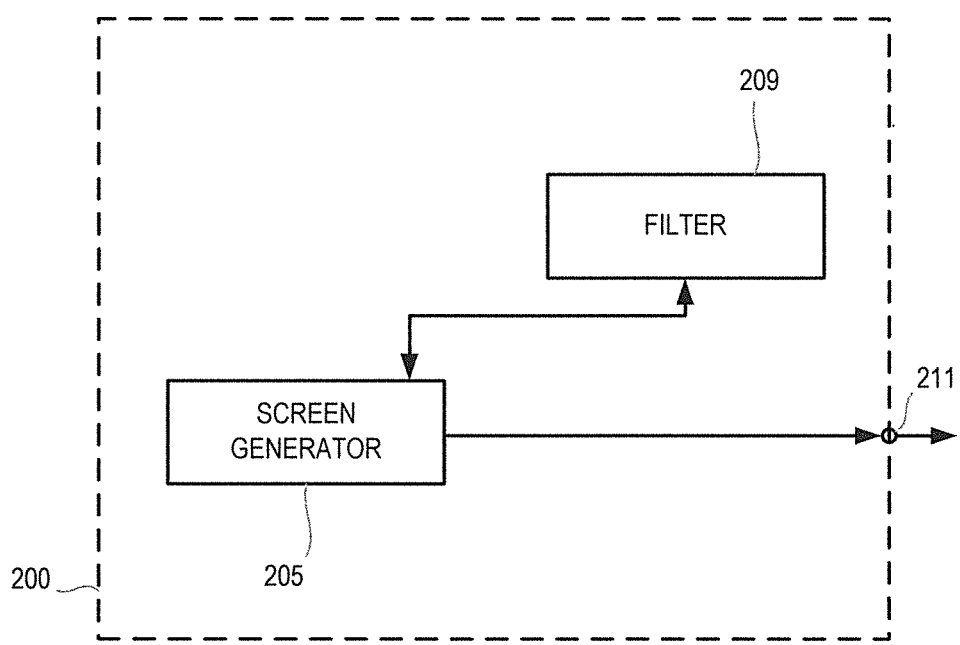
FIG. 2 is a simplified schematic of an example of apparatus for determining a halftone screen.

The printing system 130 may further comprise apparatus 200 of FIG. 2 for determining the halftone screens 152 for storage in the memory device 142. This apparatus may be performed by computing apparatus separate from the printing system 130, or alternatively provide the apparatus 200 within the printing system 130

The apparatus 200 for determining a halftone screen comprises a screen generator 205, and a filter 209. The output of the screen generator 205 is connected to an output terminal 211 which is connected to the memory device 142.

Operation of the apparatus 200 will now be described with reference to FIGS. 3 and 4a to 4f. The screen generator 205 is configured to determine, 301, a first tile (supercluster) for each gray level value. An example of a first tile 401 is shown on a laser grid 400 in FIG. 4a. For illustrative purposes a tile of 18×18 pixels is shown in FIG. 4a. It can be appreciated that the algorithm of FIG. 3 may apply to any size of tile and is not limited to that shown in FIG. 4a. The tile can range, for example, from $4^2$ to $1024^2$ pixels. The first tile is processed as described in more detail below by the screen generator 205 to generate a final second tile which forms part of the halftone screen for use in transforming a continuous tone image to a halftone image by the processing subsystem 140.

The first tile 401 comprises a plurality of pixel locations. In the example, 18×18 pixel locations form the tile in FIG. 4a.

The tile comprises a plurality of substantially equal sized cell elements 403. Each cell element 403 comprises a cluster 407_1 to 407_9 of activated pixels 405_1 to 405_4. Each cluster 407_1 to 407_9 defines the location of a printable dot. The number of activated pixel and their power determines the amount of ink in the cluster, which is proportional to the size of the printed cluster.

Figure 4A:
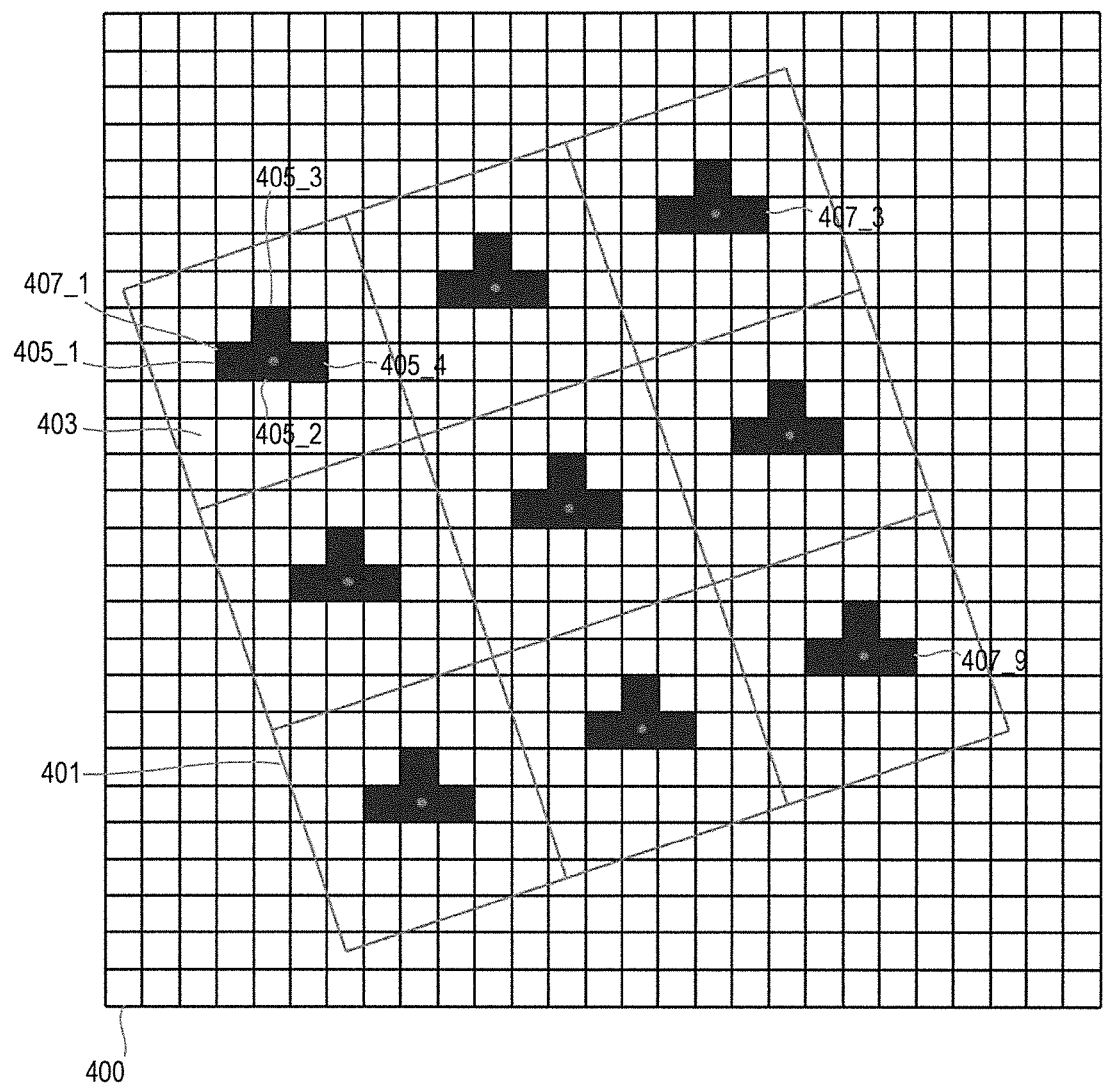
FIGS. 4a to 4f illustrate, pictorially, examples of halftone tiles at various stages of the method of FIG. 3.
Figure 4B:
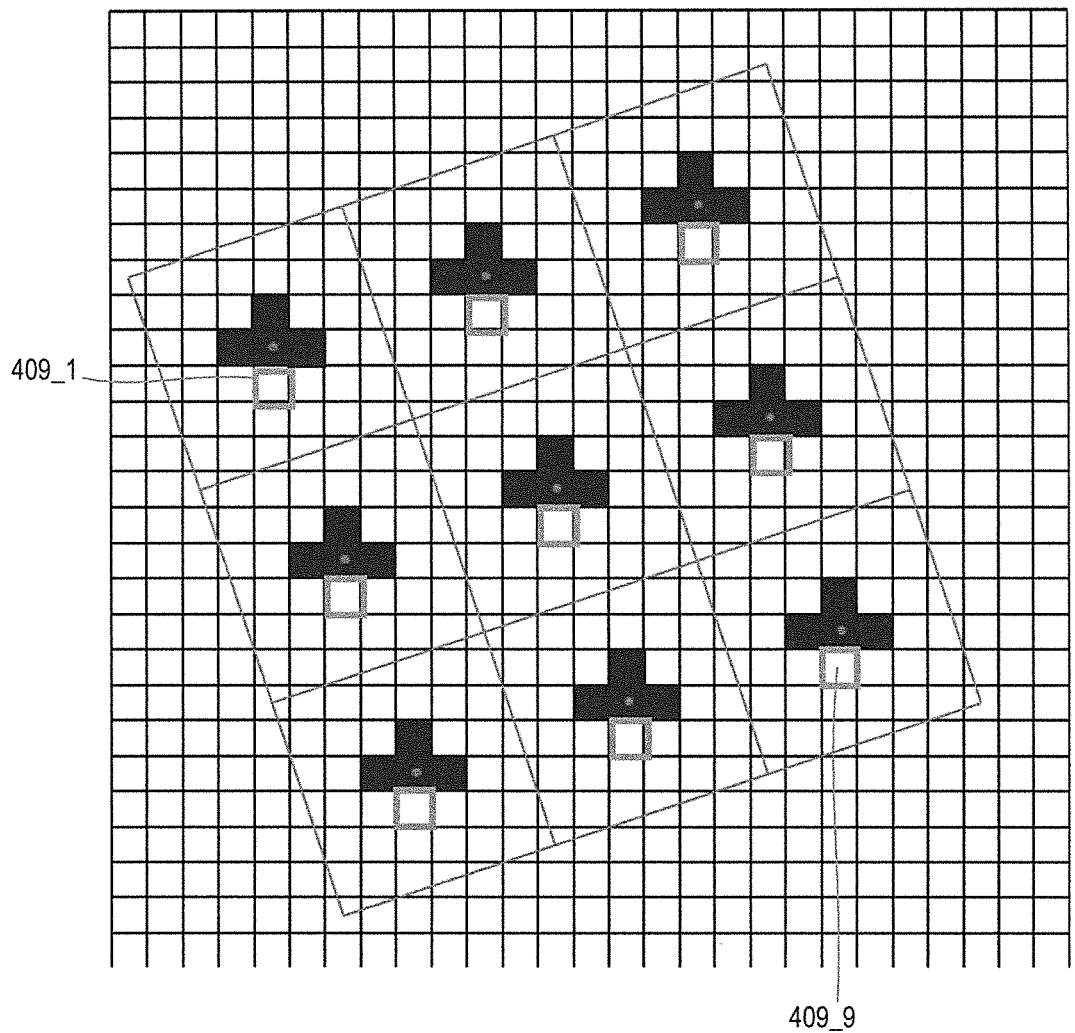

The first halftone tile 401 is determined, 301, for a first gray level. The first gray level may comprise a base gray level. The base gray level comprises a gray level value where all clusters have the same digital dot area. In the example shown in FIG. 4a, each cluster comprises 4 activated pixels 405_1 to 405_4. It can be appreciated that the example of 4 activated pixels illustrated in FIG. 4a is for illustrative purposes and the number of activated pixels may vary as required for the value of the first gray level. A plurality of pixel locations 409_1 to 409_9, as shown in FIG. 4b, are selected, 303, to form a pixel pool, by a deterministic algorithm that minimizes distances from the exact cluster center.

Figure 3:
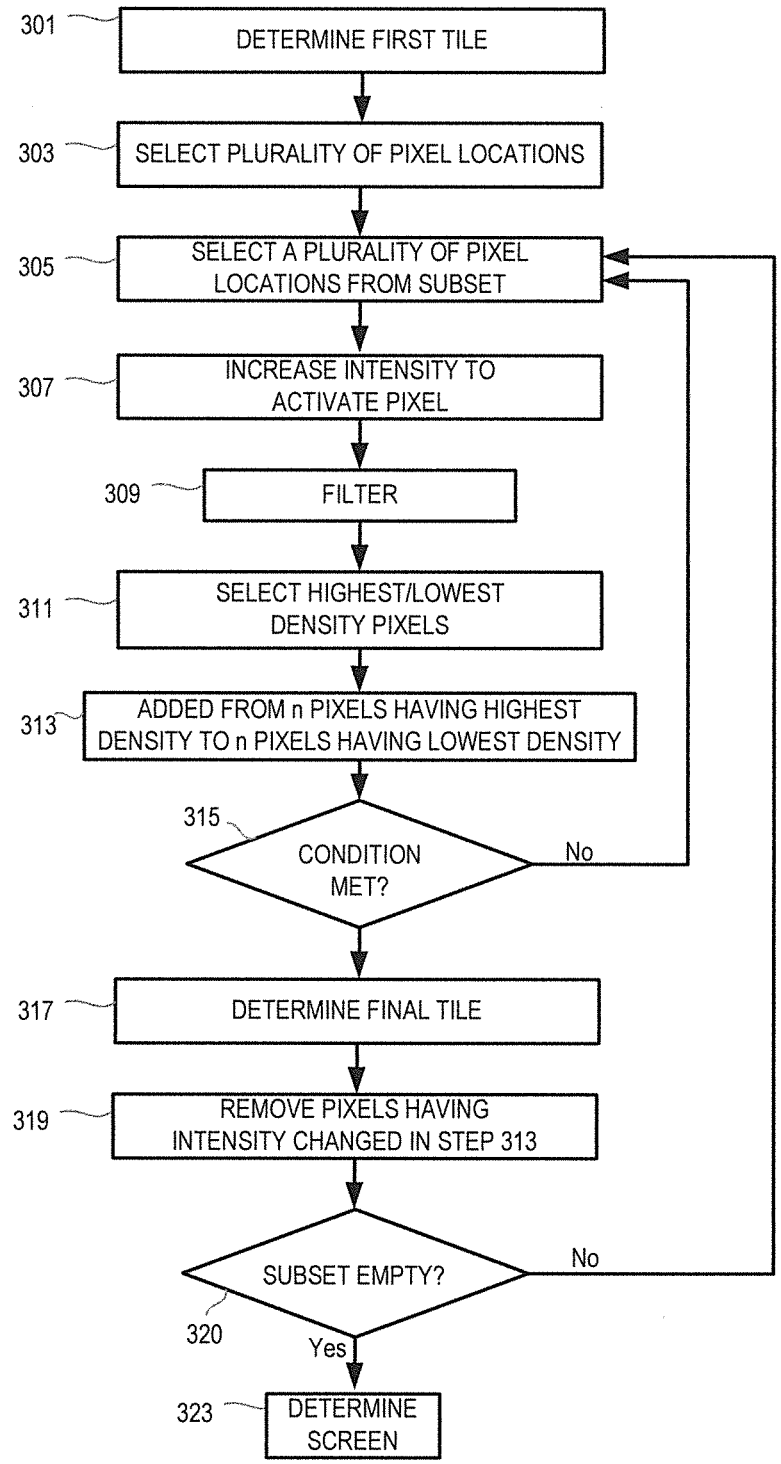
FIG. 3 is a flowchart of an example of a method of determining a halftone screen.
Figure 4C:
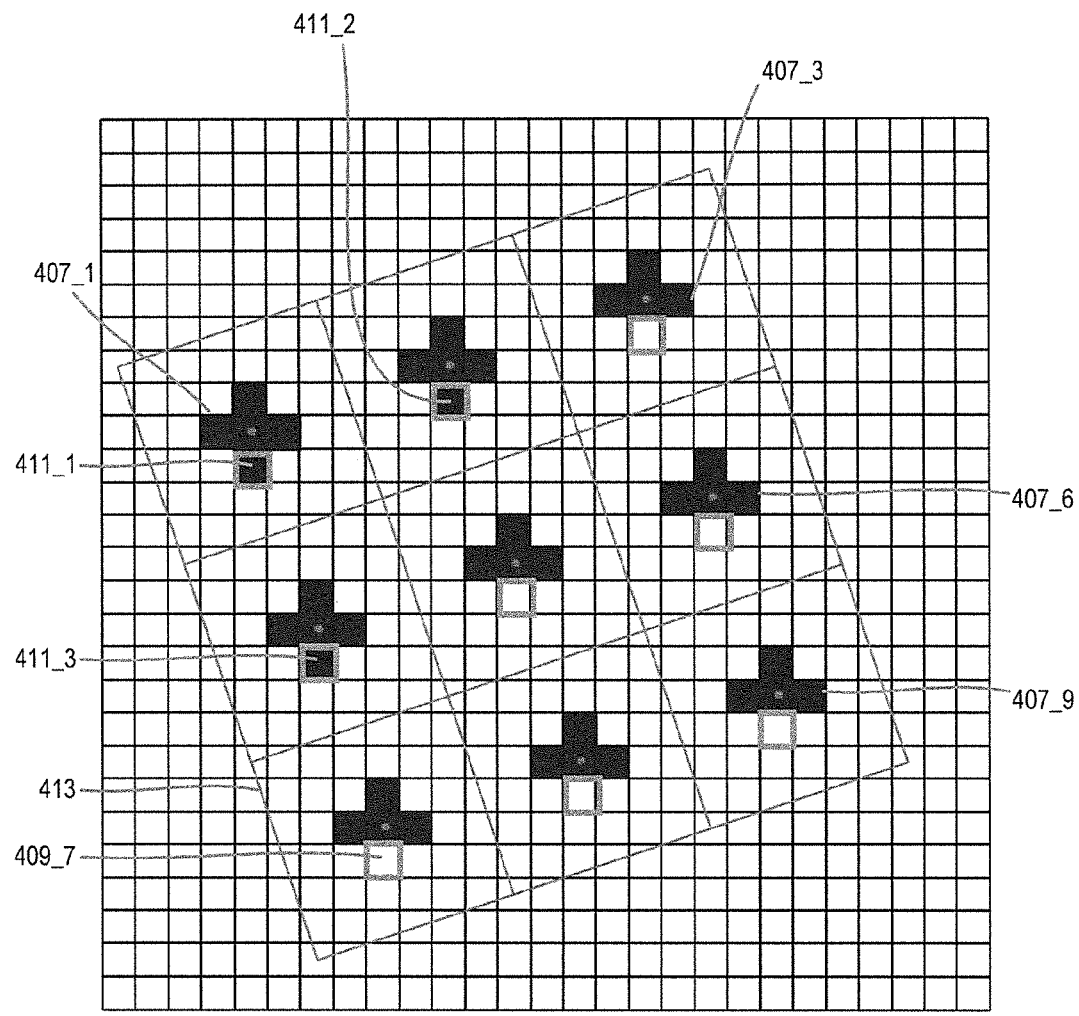

As shown in FIG. 4c, a plurality of pixel locations 411_1, 411_2, 411_3 from the pixel pool 409_1 to 409_9 are selected, 305. In this example shown in FIG. 4c, 3 pixel locations are selected. It can be appreciated that any number of pixel locations may be selected as required. The intensity of each selected location 411_1, 411_2, 411_3 is increased, 307, to activate the pixels at the selected locations as illustrated in FIG. 4c forming a second halftone tile 413, that is, activating a pixel may be achieved by increasing the laser power.

Figure 4D:
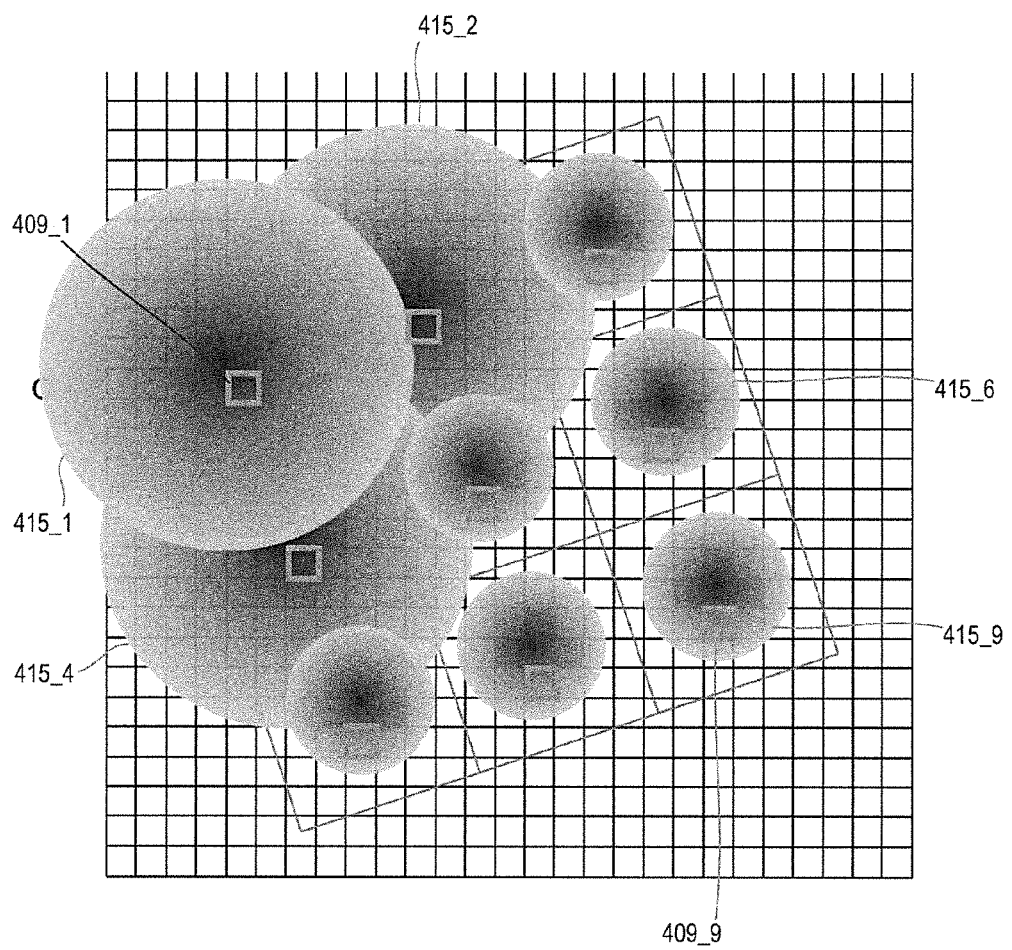
Figure 4E:
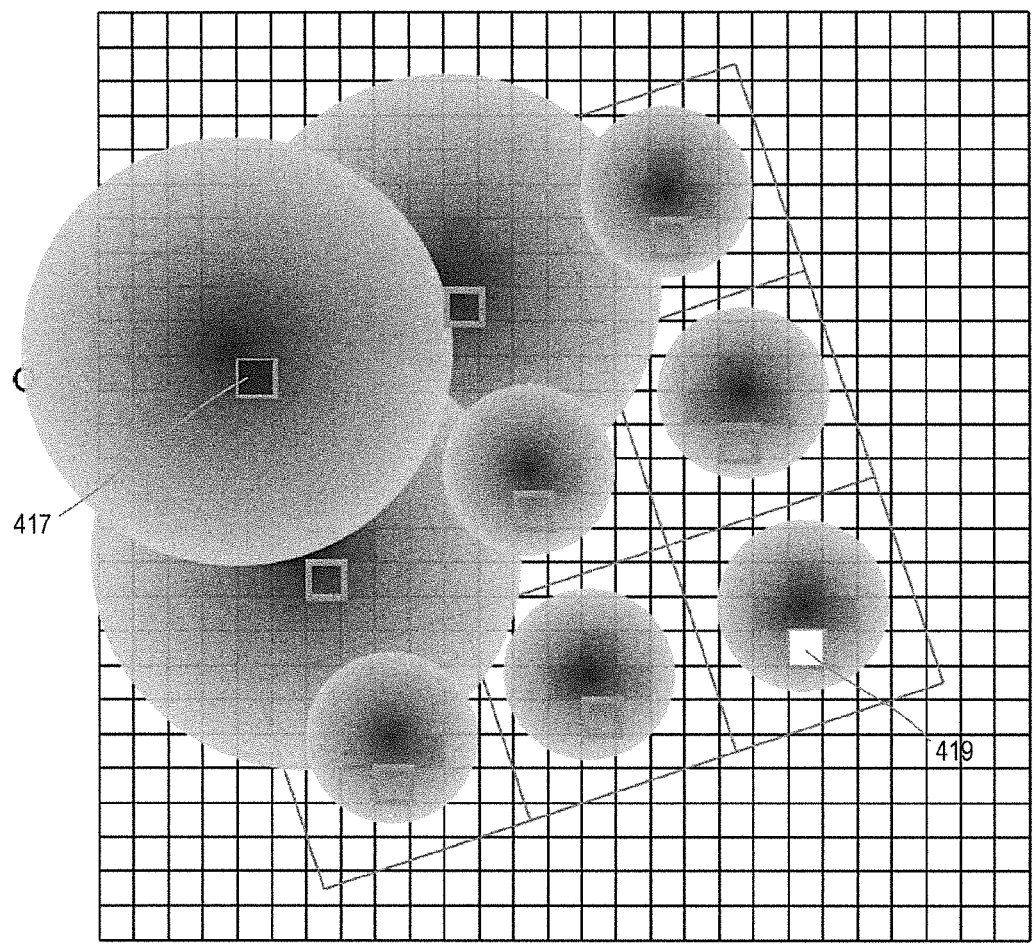

An image of the second halftone tile 413 is simulated by generating a filtered image of the second halftone tile 413 as shown in FIG. 4d by the filter 209. The image is simulated by filtering each second halftone tile 413 with a human visual system model. As illustrated in FIG. 4d, the filtered image comprises larger dots 415_1, 415_2, 415_3, 415_4 formed by the larger clusters 407_1, 407_2, 407_4.

Figure 4F:
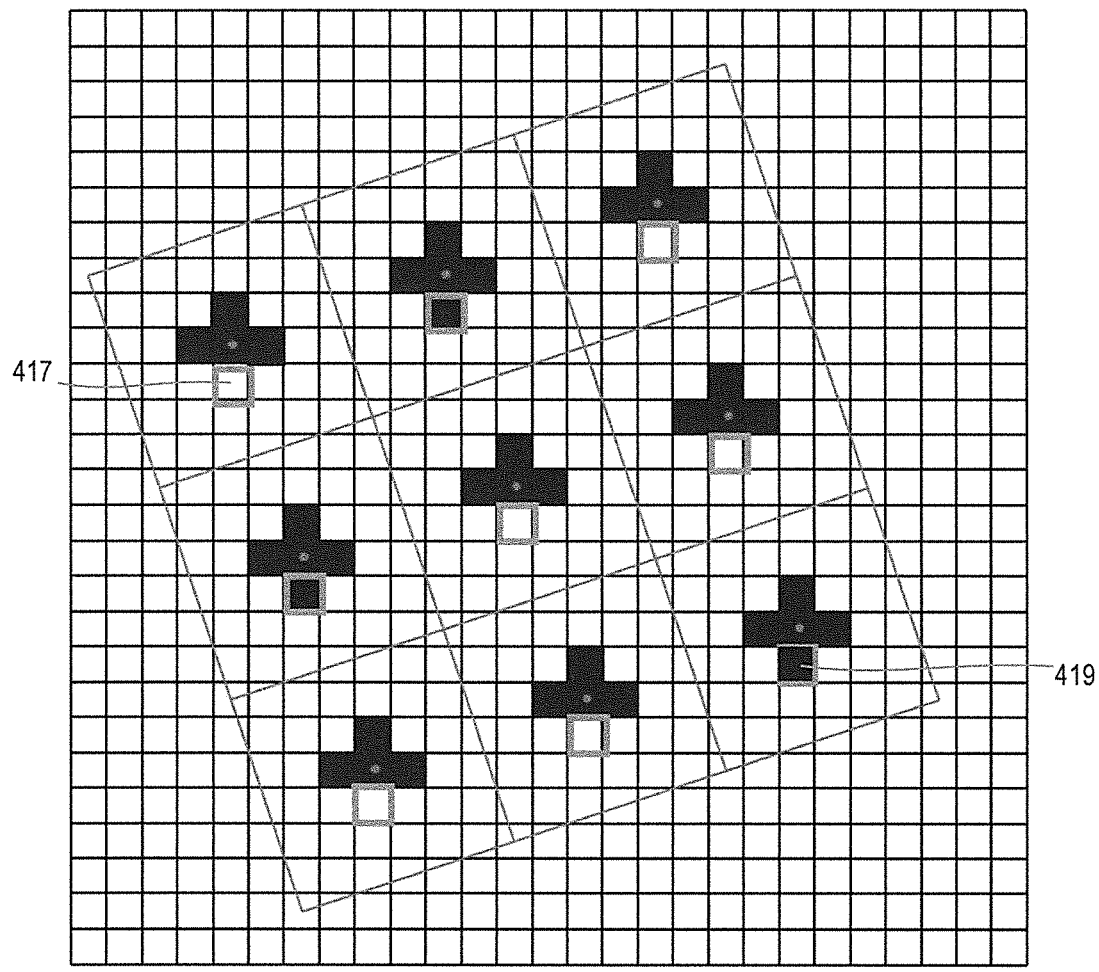

The screen generator 205 receives the filtered image from the filter 209. The clusters and voids of the simulated image are identified by selecting, 311, n activated pixels 417 from the pixel pool of the filtered image having the highest density and n non-activated pixels 419 from the pixel pool of the simulated image having the lowest density of the simulated image. In this example, n=1. The intensity of the n activated pixels 417 having the highest density are moved, 313, to the n non-activated pixels 419 having the lower density as shown in FIG. 4f to generate a new second tile having a better dot configuration than the previous second halftone tile. The steps 305, 307, 309, 311, 313 are repeated until a predetermined condition is met, 315, to determine, 317, the final second halftone tile. In this way, the algorithm finds the "best minimum" without checking all the possibilities. The n swapped pixels 417, 419 are removed, 319, from the pixel pool 409_1 to 409_9 before the next iteration. In each iteration, the number of toggled pixels decreases, till the pixel pool is empty, 320.

The predetermined condition may, for example, comprise when a cost function of the filtered image reaches a minimum or close to a minimum. The change in the cost function may be derived over m iterations and the condition is met when the change in the cost function is minimised. Steps 305 to 319 are repeated until the pixel pool is empty, 320. Steps 301 to 320 are repeated for each second tile of each gray level value, 321, until the predetermined condition is met. This is repeated for each base gray level. For each base gray level, the pixel locations of the pixel pool are selected as pixels that have a difference in intensity between the base levels.

In order to build the gray levels between the base gray levels, a pool of all pixels which change value when moving to the next consecutive base level are added to the pool and pixels are selected from the pool to turn-on for each gray level.

The halftone screen is determined, 323, using a final second tile for each base gray level and each gray level there between. The halftone screen is output by the screen generator 205 and used by the processing subsystem 153 to transform the input image to a halftone image by halftone processing.

The algorithm of FIG. 3 and as described above with reference to FIGS. 4a to 4f seeks the "best minimum" in cluster-dot halftoning, which may fit any cluster-dot threshold screen design. The algorithm provides a steepest descent algorithm for generating blue-noise patterns, i.e., aperiodic, isotropic patterns without any low-frequency spectral components. Note that low-frequency spectral components are interpreted to the human eye as noise. The fundamental principle of the algorithm above avoids large clusters and large voids of dots by replacing in each phase a pixel in the largest cluster with a pixel in the largest void. In order to achieve a fast converge rate, multiple pixels are toggled simultaneously.

In a comparison of random, cluster-dot Simulated Annealing (SA) and the algorithm above, by analyzing the convergence rate and the smoothness metrics of each method, and by viewing prints, the algorithm above was found to give the smoothest results (lowest STD, due to lower graininess and mottle) in all gray levels, especially in highlights.

The convergence rate of the algorithm of FIG. 3 is four times faster than the SA rate (4 phases compared with 15-20 in order to get the same result). Note that the random method converges as a function of the subset that is checked, which had chosen to depends on the tile size. With the set of parameters, for example choice of HVS filter or the number n of selected pixels used in the algorithm above, an irregular tile of 120×120 pixels takes 2.5 hours with the random method but does not get to optimal solution, compared with 7 hours for SA and only 1 hour with the algorithm above.

Although various examples have been illustrated in the accompanying drawings and described in the foregoing detailed description, it will be understood that the invention is not limited to the examples disclosed, but is capable of numerous modifications without departing from the scope of the invention as set out in the following claims.

The invention claimed is:

1. A method of determining a halftone screen for use in transforming a continuous tone image into a halftone image, the method comprising the steps of:
   (a) determining a first halftone tile for a first gray level, the first halftone tile comprising a plurality of pixels locations;
   (b) selecting a plurality of the pixel locations to form a pixel pool;
   (c) selecting a subset of pixel locations from the pixel pool;
   (d) increasing intensity of pixels at the selected pixel locations to activate the pixels to form a second halftone tile for a subsequent gray level;
   (e) generating a filtered image of the second halftone tile;
   (f) selecting n activated pixels from the pixel pool having the highest density in the filtered image and n non-activated pixels from the pixel pool having the lowest density in the filtered image;
   (g) moving the intensity added from the n pixels having the highest density to the n pixels having the lower density to generate a new second halftone tile;

(h) repeating steps (c) to (g) until a predetermined condition is met;
(i) determining the halftone tile for the current gray level as the final second halftone tile;
(j) removing the n selected pixels from the pixel pool;
(k) repeating steps (c) to (j) until the pixel pool is empty for each subsequent gray level; and
(l) determining a halftone screen comprising a plurality of the final second halftone tiles.

2. A method according to claim 1, wherein the method further comprises
defining a plurality of gray level values as base gray level values; wherein steps (a) to (k) are repeated for each base gray level and the plurality of the pixel locations to form a pixel pool are selected as pixels that have a difference in intensity between two subsequent base levels.

3. A method according to claim 2, wherein step (b) comprises:
selecting a plurality of pixel locations to form a pixel pool from the first halftone tile such that each of the pixel locations in the pixel pool are connected to form a cluster of pixels.

4. A method according to claim 3, wherein the step of defining a plurality of base gray level values comprises:
a gray level at which the number of activated pixels in each cluster of the first halftone tile is substantially the same.

5. A method according to claim 1, wherein step (c) comprises randomly selecting the plurality of pixel locations from the pixel pool.

6. A method according to claim 1, wherein step (e) comprises
generating a filtered image of the second halftone tile using a human visual system model to generate the filtered image.

7. A method according to claim 1, wherein the condition of step (h) comprises a minimum over a cost function of the filtered image.

8. Apparatus for determining a halftone screen for use in transforming a continuous tone image into a halftone image, the apparatus comprising:
a screen generator configured to:
(a) determine a first halftone tile for a first gray level, the first halftone tile comprising a plurality of pixels locations;
(b) select a plurality of the pixel locations to form a pixel pool;
(c) select a subset of pixel locations from the pixel pool;
(d) increase intensity of pixels at the selected pixel locations to activate the pixels to form a second halftone tile for a subsequent gray level;
(e) select n activated pixels from the pixel pool having the highest density in a filtered image of the second halftone tile and n non-activated pixels from the pixel pool having the lowest density in the filtered image;
(f) move the intensity added from the n pixels having the highest density to the n pixels having the lower density to generate a new second halftone tile;
(g) repeat steps (c) to (f) until a predetermined condition is met;
(h) determine the halftone tile for the current gray level as the final second halftone tile;
(i) remove the n selected pixels from the pixel pool;
(j) repeat steps (c) to (i) until the pixel pool is empty for each subsequent gray level; and
(k) determine a halftone screen comprising a plurality of the final second halftone tiles.

9. Apparatus according to claim 8, wherein the screen generator is further configured to:
define a plurality of gray level values as base gray level values; and repeat steps (a) to (j) for each base gray level and the plurality of the pixel locations to form a pixel pool are selected at which pixels that have a difference in intensity between two subsequent base levels.

10. Apparatus according to claim 9, wherein the pixel pool comprises pixel locations connected to form a cluster of pixels.

11. Apparatus according to claim 10, wherein the base gray level comprises a gray level value at which the number of activated pixels of each cluster of the first halftone tile is substantially the same.

12. Apparatus according to claim 8, wherein the screen generator is further configured to:
randomly selecting the plurality of pixel locations from the pixel pool.

13. Apparatus according to claim 8, wherein the apparatus further comprises
a filter configured to
filter each first halftone tile with a human visual system model to generate the filtered image.

14. An image processing system for transforming a continuous tone image into a halftone image, the system comprising apparatus for determining a halftone screen for use in transforming a continuous tone image into a halftone image, the apparatus comprising:
a screen generator configured to:
(a) determine a first halftone tile for a first gray level, the first halftone tile comprising a plurality of pixels locations;
(b) select a plurality of the pixel locations to form a pixel pool;
(c) select a subset of pixel locations from the pixel pool;
(d) increase intensity of pixels at the selected pixel locations to activate the pixels to form a second halftone tile for a subsequent gray level;
(e) select n activated pixels from the pixel pool having the highest density in a filtered image of the second halftone tile and n non-activated pixels from the pixel pool having the lowest density in the filtered image;
(f) move the intensity added from the n pixels having the highest density to the n pixels having the lower density to generate a new second halftone tile;
(g) repeat steps (c) to (f) until a predetermined condition is met;
(h) determine the halftone tile for the current gray level as the final second halftone tile;
(i) remove the n selected pixels from the pixel pool;
(j) repeat steps (c) to (i) until the pixel pool is empty for each subsequent gray level; and
(l) determining a halftone screen comprising a plurality of the final second halftone tiles;
a halftoning system configured to
apply the halftone screen to the continuous tone image to transform the image into a halftone image.

15. A printing system including
a processing subsystem for transforming a continuous tone image into an halftone image, the processing subsystem comprising
apparatus for determining a halftone screen, the apparatus comprising:
a screen generator configured to:
(a) determine a first halftone tile for a first gray level, the first halftone tile comprising a plurality of pixels locations;

(b) select a plurality of the pixel locations to form a pixel pool;
(c) select a subset of pixel locations from the pixel pool;
(d) increase intensity of pixels at the selected pixel locations to activate the pixels to form a second halftone tile for a subsequent gray level;
(e) select n activated pixels from the pixel pool having the highest density in a filtered image of the second halftone tile and n non-activated pixels from the pixel pool having the lowest density in the filtered image;
(f) move the intensity added from the n pixels having the highest density to the n pixels having the lower density to generate a new second halftone tile;
(g) repeat steps (c) to (f) until a predetermined condition is met;
(h) determine the halftone tile for the current gray level as the final second halftone tile;
(i) remove the n selected pixels from the pixel pool;
(j) repeat steps (c) to (i) for each subsequent gray levels until the pixel pool is empty; and
(k) determine a halftone screen comprising a plurality of the final second halftone tiles;
a halftoning subsystem configured to
transform the continuous tone image into a halftone image using the determined screen; and
a printing device configured to print the halftone image.

* * * * *